US008300614B2

(12) United States Patent
Ankaiah et al.

(10) Patent No.: US 8,300,614 B2
(45) Date of Patent: Oct. 30, 2012

(54) PREVENTING PACKET LOOPS IN UNIFIED NETWORKS

(75) Inventors: Shashi H. Ankaiah, Mandya Karnataka (IN); Vivek L. Atreya, Bangalore (IN); Kumara Das Karunakaran, San Jose, CA (US); Seemant Choudhary, Fremont, CA (US)

(73) Assignee: Avaya Inc., Basking Ridge, NJ (US)

( * ) Notice: Subject to any disclaimer, the term of this patent is extended or adjusted under 35 U.S.C. 154(b) by 374 days.

(21) Appl. No.: 12/772,299

(22) Filed: May 3, 2010

(65) Prior Publication Data

US 2010/0290385 A1    Nov. 18, 2010

Related U.S. Application Data

(60) Provisional application No. 61/178,263, filed on May 14, 2009.

(51) Int. Cl.
*H04Q 7/24* (2006.01)

(52) U.S. Cl. ........................................................ 370/338

(58) Field of Classification Search .................. None
See application file for complete search history.

(56) References Cited

U.S. PATENT DOCUMENTS

| | | | |
|---|---|---|---|
| 4,797,589 A * | 1/1989 | Collins | 398/46 |
| 6,192,054 B1 * | 2/2001 | Chan et al. | 370/452 |
| 6,304,639 B1 * | 10/2001 | Malomsoky et al. | 379/112.04 |
| 6,496,505 B2 * | 12/2002 | La Porta et al. | 370/392 |
| 6,597,663 B1 * | 7/2003 | Rekhter | 370/252 |
| 7,239,618 B1 * | 7/2007 | La Porta et al. | 370/331 |
| 7,869,347 B2 * | 1/2011 | Bell et al. | 370/218 |
| 7,924,815 B2 * | 4/2011 | McRae et al. | 370/352 |
| 2002/0057657 A1 * | 5/2002 | La Porta et al. | 370/331 |
| 2006/0256775 A1 * | 11/2006 | McRae et al. | 370/352 |
| 2007/0036178 A1 * | 2/2007 | Hares et al. | 370/490 |

\* cited by examiner

*Primary Examiner* — Hassan Phillips
*Assistant Examiner* — Prenell Jones
(74) *Attorney, Agent, or Firm* — Anderson Goreck & Rouille LLP (57) ABSTRACT

Unified mobility switches often define a virtual LAN (VLAN), including a combination of mobility tunnels and access tunnels, via which packets are transported to a mobile device over a combination of physical connections and wireless links. A unified switch may have multiple ports available to route a packet to a particular destination, since the unified switches identify routing paths for both physical connections and VLANs. A particular unified switch may therefore have multiple routes to a common destination, which can lead to a routing loop across a network of switches supporting both physical and virtual connections. A unified mobility switch provides loop detection and prevention through a set of rules for qualifying connections as virtual tunnels or physical connections, and defining a single path where multiple potential paths exist.

20 Claims, 9 Drawing Sheets

PREVENTING PACKET LOOPS IN UNIFIED NETWORKS

CROSS REFERENCE TO RELATED APPLICATIONS

This Patent Application claims the benefit under 35 U.S.C. §119(e) of U.S. Provisional Patent Application No. 61/178,263 filed on May 14, 2009, entitled, "Method to Prevent Packet Loops in Unified Networks," the contents and teachings of which are hereby incorporated by reference in their entirety.

BACKGROUND

Wireless networks have gained popularity in recent years as the onset of cellphones has led to ever increasing computing capability in the form of a hand-held or highly portable personal wireless device. So-called WiFi and newer WiMax capabilities provide wireless routing and throughput at transmission rates once achievable only by wired connections. Newer wireless mobile devices provide capabilities of email, media playback, and web browsing formerly only available in wired devices. As popularity of personal mobile devices increases, developers continue to produce increasingly bandwidth-hungry applications. Thus, the resulting user demand triggers an industry response resulting in increasing per-user bandwidth consumption. The underlying network infrastructure supporting this wireless demand therefore continues to be pushed to transport additional bandwidth for supporting the user base.

Wireless networks strive to provide performance similar to that of wired networks, and tend to be focused on individual consumer needs, such as email, voice calls, Internet browsing, and other computational activities that appeal to ad-hoc and spontaneous needs of an individual user, as opposed to regular and predictable business and industrial uses that often require additional and more predictable bandwidth. Conventional wired networks adapted to the introduction of WiFi according to IEEE 802.11b/g, and wireless operation was typically viewed as an add-on to conventional networks. Thus, network administrators addressed the novel technology by adding a few wireless routers as appendages to the wired infrastructure. However, the proliferation of WiFi enabled devices, and more recently WiMax based communications, has led to increasing use of wireless networks even in corporate environments. Accordingly, modern network management recognizes both wired and wireless operations in a unified switch, as opposed to conventional wired network management that addressed wireless operations as a separate tangential aspect in a separate wireless router or as a separate wireless endpoint.

SUMMARY

In a mobility network providing message transport for wired and mobile (e.g. wireless) devices, virtual LANs (Local Area Networks) are employed for transporting message traffic between users. Mobility switches associate user devices with VLANs, and route messages via the VLANs, which group a set of physically disparate users (i.e. devices) as if they were interconnected on the same LAN. Mobility switches, configured for transporting wired and wireless (e.g. mobility) traffic, forward message traffic on ports based on a topology. The ports may correspond to wired connections to adjacent mobility switches, or to VLANs. If a particular destination is reachable by multiple ports because a destination corresponds to both a wired and VLAN connection, a topology directs the message traffic such that ambiguous and circular forwarding patterns resulting in a routing loop are avoided. A set of rules applied at the mobility switches ensures that forwarding decisions among VLAN and wired routes does not result in such a routing loop.

Conventional wired networks employ an interconnected set of nodes (routers, switches, bridges, etc), each with a routing table indicative of an adjacent physically connected node. Each routing table is therefore a list of adjacent routers and the physical connection corresponding to it. A destination address of an incoming packet is compared to the routing table to find a match with the destination address on the packet; a match is a complete or partial correspondence of the packet address to the address reachable via the physical connection. A message packet traverses the network by consulting the conventional routing table at each router, and traveling through the network in a series of "hops" from router to router. In a typical TCP/IP network such as the Internet, an address is a 4 byte IP address.

The unified switch (mobility switch) transports wired and wireless message traffic, in contrast to conventional wireless controllers through which all wireless traffic is funneled. The unified switch therefore operates as both a mobility switch for mobile devices (i.e. cellphones, laptops, PDAs and various combinations thereof in a personal mobile device), and as a wired switch for wired transport.

Configurations herein are based, in part, on the observation that virtual tunnels and ports ultimately map to physical connections. Therefore, a particular unified switch may have multiple routes, physical and virtual, to a common packet destination. A Mobility virtual LAN (VLAN) defines a wireless communication path to a mobile device (user), end employs a tunnel or combination of mobility tunnels and access tunnels, described further below, mapped via ports on the unified switch similarly to wired endpoint connections.

In a wireless arrangement, routing (i.e. switching of message traffic between mobility switches) generally occurs as in a wired network, except that the last "hop" to the destination is via a wireless link (typically an RF connection) via a wireless access point, such as WiFi based 802.11a/b/g/n arrangements. Newer so-called WiMax also employ a final wireless "hop", although typically over a longer distance. It should be noted that the forwarding logic employing the VLAN membership for avoiding loops (i.e. circuitous routes among a combination of physical connections and VLAN based forwarding), as employed in the example mobility domain discussed herein, is directed to L2 forwarding and switching. Alternate configurations may apply similar operation on the scale of an L3 routing loop without deviating from the scope of the claimed approach.

The unified switches often define a virtual LAN (VLAN), including a combination of mobility tunnels and access tunnels, via which packets are transported to a mobile device over a combination of physical connections and wireless links. The virtual LAN (VLAN) in a unified switch can have both virtual tunnel ports or physical ports as its members. In the unified switches, routing decisions are performed based on ports that correspond to links to other unified switches. The links may be supported by either physical connections or virtual tunnels. Thus, from a particular unified switch, multiple ports (both tunnel and physical) may be available to route a packet to a particular destination, since the unified switches identify routing paths for both physical connections and virtual ports.

Unfortunately, conventional wireless networks suffer from the shortcoming that the mix of wired connectivity ports and virtual ports may result in multiple possible mappings for a particular destination, which can lead to a routing loop across a network of switches supporting both physical and virtual connections. Conventional wired networks employ facilities such as a time to live (TTL) value to guard against looped or lost packets, which specifies a maximum number of hops after which a packet terminates. However, the packet continues to consume routing resources and must be replicated if the underlying message is to be completed.

It would be beneficial, therefore, to identify potential looping paths created by a duality of physical and virtual connections to the same destination. Accordingly, configurations herein substantially overcome such shortcomings by providing loop detection and prevention through a set of rules for qualifying connections as virtual tunnels or physical connections, and defining a single path where multiple potential paths exist.

In further detail, configurations disclosed further below disclosed a method of loop prevention in a unified split-plane mobility domain by identifying a topology of unified switches for transporting message traffic, in which the message traffic is defined by packets as is common in TCP/IP networks such as the Internet. A unified (mobility) switch identifies a set of links between the unified switches for forwarding message traffic packets, such that the links are defined by ports on each of the unified switches, and computes, based on a destination, at least one port corresponding to the destination. Each of the links corresponds to a virtual tunnel or a physical connection and accessible via a port on the unified switch. Loop detection includes determining, at a unified switch forwarding a packet to a destination, when forwarding on a particular port could cause a loop back to the forwarding switch because of multiple forwarding ports to both VLANs and wired connections, and preventing such a forwarding decision by applying forwarding rules at the mobility switch performing the forwarding. The unified switch identifies, in response to the determined loop, a loop rule indicative of another port for forwarding to the destination, and, based on applying the rule to the forwarding logic in the mobility switch, forwarding the packet on the identified port corresponding to a different one of a tunnel or a physical port than the particular port that could cause the loop.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a non-transitory computer readable storage medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Disclosed below is an example configuration of an enterprise mobility network defining a mobility domain such as that at a corporate or university campus or site adapted for use with a conventional LAN. As the unified switches support both wireless and wired message traffic, the unified switches perform functions of a wireless switch, in addition to wired routing, and therefore operate as a mobility switch to support roaming from one switch to another by a mobile device. The example mobility domain shown in the diagram below include a configuration of network elements, such as switches, access points, and user devices, in an arrangement and number suitable for illustrating the principles of the claimed invention. Other configurations may include other or additional network elements without departing from the substance of the claims.

The disclosed domain is a split-plane architecture for transporting wireless message traffic and is employed for deploying a plurality of mobility switches in a mobility domain, such that the mobility switches define the data plane of the mobility domain and have a coupling to the mobility controller in the control plane of the mobility domain, in which the data plane performs routing and switching for user data traffic. Each unified switch, therefore, includes the functionality of a mobility switch for supporting wireless message traffic as well as L2/L3 wired message traffic. It should be noted that "wireless" message traffic as employed herein refers to communications either to or from a mobile device that includes a link between a wireless access point to the mobile device, although the transport path may include wired links such as from the access point to the mobility switch and from the mobility switch to other switches and/or wired network nodes/entities.

In configurations disclosed herein, a virtual network groups devices for communication independently of the physical connections between them. Such a virtual network is identified by a virtual network identifier, discussed further below. The virtual network identifier denotes collection of devices corresponding to a logical LAN configured such that communication is enabled as if they were part of the same wire (LAN). In the disclosed arrangement, a VLAN (virtual LAN) has the same attributes as a physical LAN, but it allows for network nodes (e.g. switches, mobile devices, stationary endpoints) to be grouped together even if they are not physically located on the same network switch. Network reconfiguration can therefore be performed through software instead of physically relocating devices. In the particular configuration disclosed, the virtual network identifier is a VLAN identifier as defined by IEEE 802.1Q.

As disclosed above, however, VLAN membership can group devices such that there are multiple routes to a particular destination. A mobility switch may identify multiple ports, corresponding to physical connections and VLAN based paths, that are included in a routing path to a recipient. Since a VLAN is a grouping of devices treated as part of the same LAN, effectively "virtualizing" the physical connections between them, the loop prevention rules disclosed further below manage VLAN membership such that circuitous routes are avoided.

Figure 1:
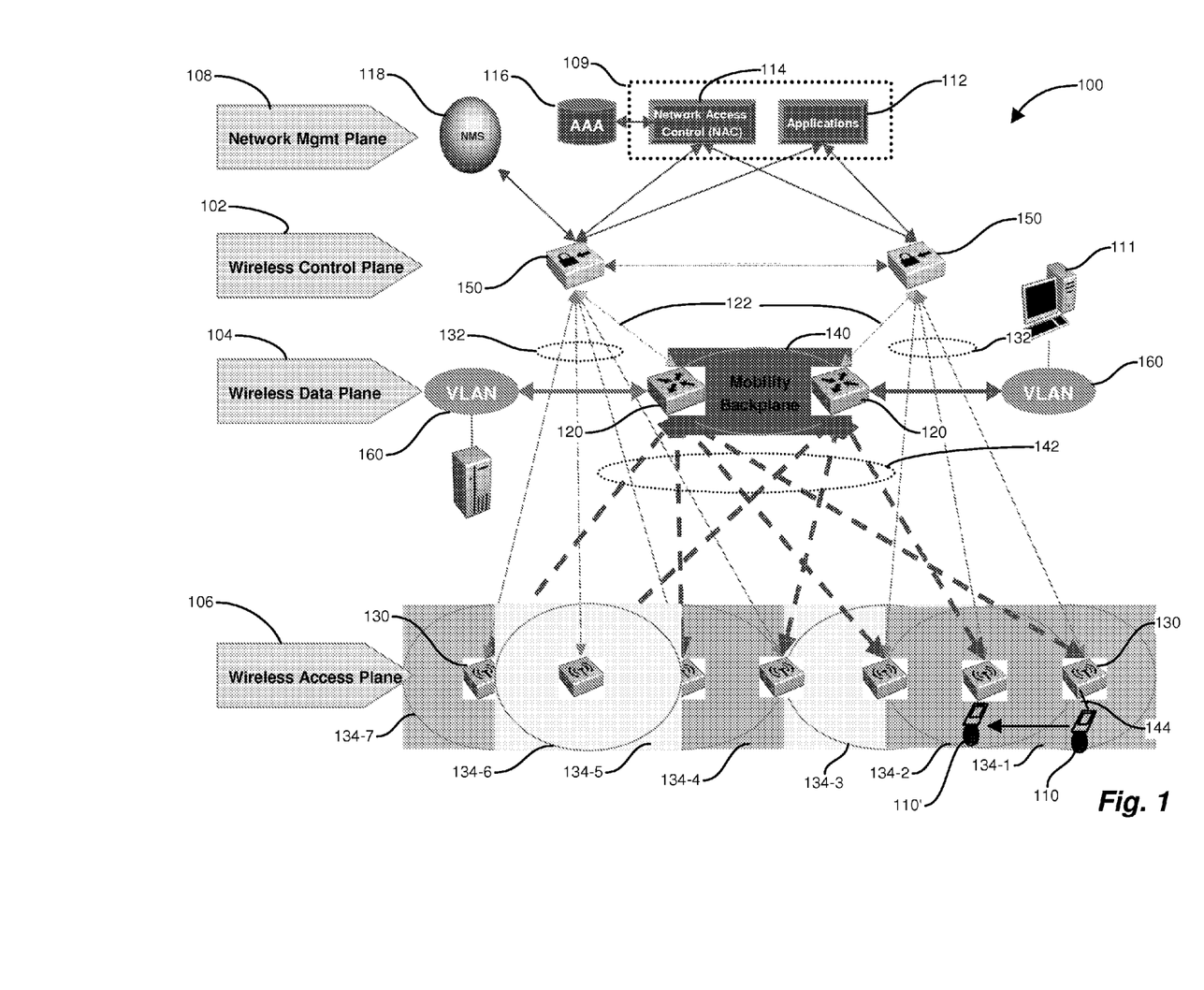
FIG. 1 is a context diagram of a mobility domain suitable for use with the present configuration.

FIG. 1 is a context diagram of a mobility domain suitable for use with the present configuration. Referring to FIG. 1, the mobility domain 100 is generally separable into distinct planes of parallel operations that occur in the wireless network defining the mobility domain 100. The mobility domain 100 is an enterprise wide network that typically encompasses a particular site of a corporation or institution, and is analogous to an area traditionally served by a conventional LAN (local area network). In the mobility domain 100, a wireless control plane 102 performs radio, AP management, mobility control, user access and authentication through a wireless controller 150. The wireless control plane 102 therefore admits users to the mobility domain 100, and also transports control information in the form of user policies, tunnel management and radio access information, shown by arrows 122 and 132 respectively. Once admitted to the mobility domain (i.e. logging on, activating a wireless user device 110, etc.), a typical user invokes the data plane 104 for performing message traffic transport. The data plane 104 performs transport and switching of data to and from the user device 110, using the control information supplied by the control plane 102 to mobility switches 120 and access points 130 using a fabric of network connections 142. The wireless access plane 106 bridges the wireless gap from the wireless access point 130 to the user device 110 using a wireless connection 144, and includes modulation and transmission of the data via an RF channel medium. The wireless access plane 106 generally provides an overlapping arrangement of coverage areas 134-1 . . . 134-7 (134 generally) to support roaming.

A network management plane 108 provides centralized storage and coordination of items global to the mobility domain, such as applications 112, user authentication information and other network access control 114, and an Authentication, Authorization and Accounting (AAA) database DB, 116. A network management system (NMS) 118 also provides operator oversight and diagnostic information such as SNMP based inquires. Virtual LANs (VLANs) 160 provide virtual connections across a plurality of physical and/or wireless connections 142 and 144 to permit roaming from coverage area 134 to coverage area 134-N, as shown by the mobile device 110 in coverage area 134-1 moving to coverage area 134-2 as mobile device 110'. The mobility domain 100 therefore provides mobility connectivity for mobile devices 110 through wireless switches 120 and access points 130, and also performs wired switching in a mobility backplane 140 and for fixed devices, discussed further below.

Figure 2:
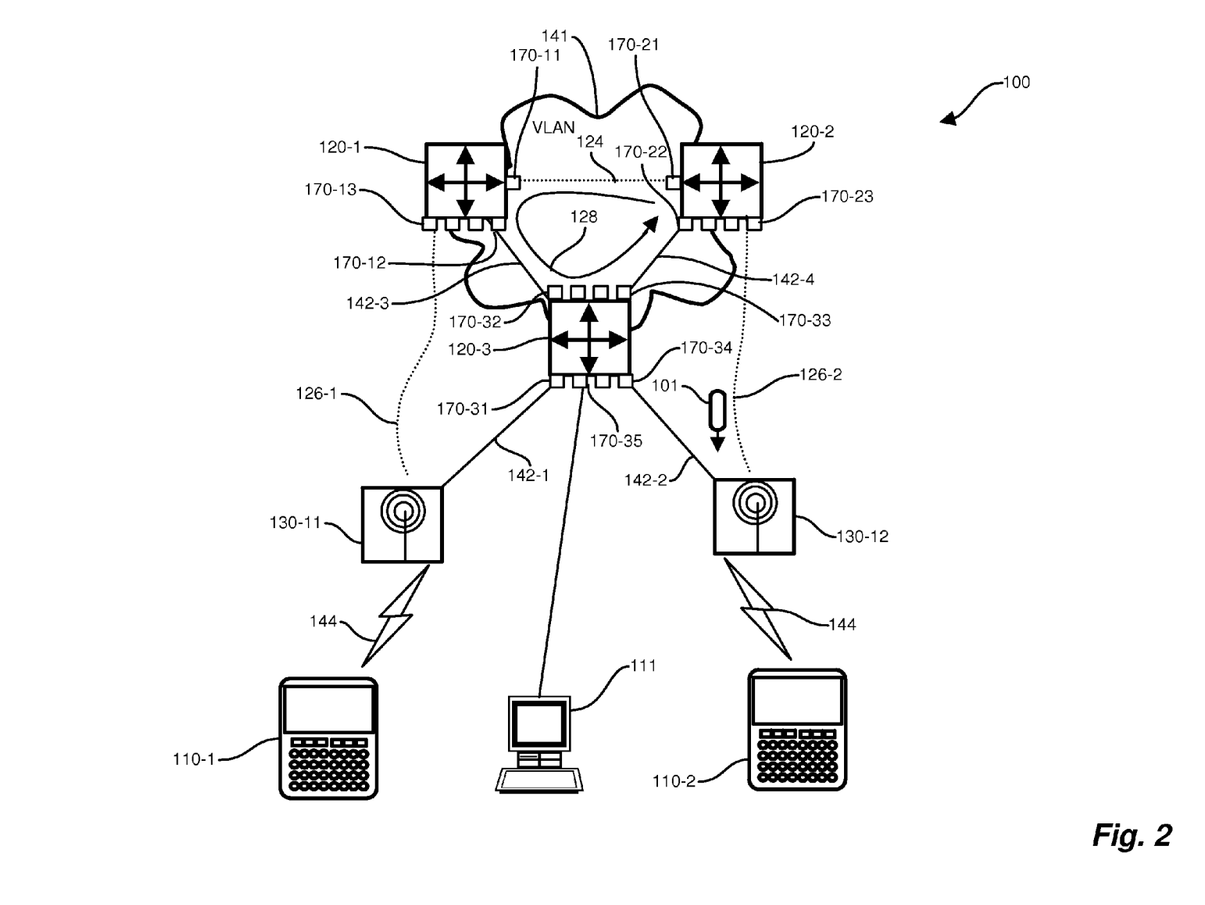
FIG. 2 is a block diagram of a unified mobility switch configuration illustrating loop prevention.

FIG. 2 is a block diagram of a unified mobility switch configuration illustrating loop prevention. Referring to FIGS. 1 and 2, a wired switch 120-3 and a plurality of mobility switches 120-1 . . . 120-2 define a mobility VLAN 141 interconnecting each of the switches 120. The mobility VLAN is part of the mobility backplane 140. As indicated above, the mobility backplane 140 may also include switches such as 120-3 exclusively for wired L2/L3 transport interconnected with the unified mobility switches 120-1, 120-3. Physical connections 142-1 . . . 142-4 (142 generally) interconnect the switches 120 and access points 130-11 . . . 130-12 (130 generally) for wired transport. The access points 130 maintain radio frequency (RF) links 144 with mobile devices 110-1 and 110-2, according to WiMax or other 802.11 or similar wireless coupling.

In addition to the wired connections 142, the mobility domain 100 also includes mobility tunnels 124 and access tunnels 126-1 . . . 126-2 (126 generally). The mobility tunnels 124 operate between mobility switches 120 to support roaming, and the access tunnels 126 operate between mobility switches 120 and access points 130. Generally, the tunnels 124, 126 are part of mobility VLANs for maintaining a connection to a mobile device 110, and represent mappings to multiple physical connections 142 referenced by a port 170-11 . . . 170-35 (170 generally). Since the switches 120 have visibility of both tunnels 124, 126, and physical connections 142, ports 170 corresponding to both may be viable for forwarding to a destination such as a mobile device. During switching operations, typically involving parsing a routing table or similar mapping of destinations to ports, multiple ports 170 may indicate a path leading to a common destination. For example, from mobility switch 120-2, port 170-22 maps to a physical connection leading to L2 switch 120-3 (via 142-4). Similarly, port 170-21 maps to mobility tunnel 124, leading to mobility switch 120-1. Thus, a packet from 110-2 to a destination on the mobility VLAN 141 arriving at mobility switch 120-2 through access tunnel 126-2 may be forwarded on either port 170-22 or 170-21 since both define paths to the intended destination.

In classic Layer-2 switching, multiple paths are chosen for the same packet if the destination address indicates it is a multicast or a broadcast frame and also if there is no entry existing in the forwarding database (unknown unicast). Due to this behavior, if the forwarding path contains multiple paths across devices in the same VLAN, such packets can cause infinite loops causing traffic disruptions and resource consumption. A loop path 128 is illustrated by a port selection from mobility switch 120-2 attempting to switch a packet from mobility device 110-2 to some destination in Mobility VLAN 141. Port 170-21 is selected to access a VLAN mapped to port 170-21, leading to 120-1. If port 170-12 is selected from mobility switch 120-1, as a viable path to the destination, the packet will be forwarded to L2 switch 120-3. From switch 120-3, the physical connection 142-4 may be seen as a one of the viable paths to the destination if L2 Switch 120-3 does not have an entry in its forwarding path for the destination, thus creating the forwarding loop 128. To avoid possible multiple routes from a mobility switch 120 resulting from both virtual (tunnel) ports and physical ports having a path to a common destination, a set of rules defines precedence if multiple forwarding paths are available. For example, a rule may state that, in the event of a tunnel port 170-21 and a physical port 170-22 visible of the same destination, the physical route takes precedence. In the example above, such a rule would have avoided the looping path 128 started by forwarding on port 170-21, and would instead have routed (forwarded) on port 170-22 to L2 switch 120-3, and subsequently to the destination port 170-33 at switch 120-3, avoiding ambiguity over multiple potential paths from different mapped ports 170. It should be noted that the loop prevention "rules" as disclosed herein are a proactive configuration measure preventing looping routing decisions from occurring. The potential loop paths disclosed herein are identified as a configuration matter, not processed as a branch instruction as part of active message (packet) forwarding.

The loop prevention rule may be restated as follows: In a mobility network 100 consisting of physical ports and virtual tunnel ports, the tunnel port is a virtual port and identified by the IP address and the UDP port. An administrator or operator configures the physical ports 170 in a VLAN 141 on a Mobility Switch 120 (recall that a unified switch as referred to above includes the switching capability for wireless message traffic implied by mobility switch as well as wired message traffic transport). The mobility switches 120-1,120-2 establish a mobility tunnel 124 between them through a tunnel management protocol. When two mobility switches 120 provide connectivity in a VLAN (at least two switches provides redundancy), packet loops 128 may form if the packet 101 frames (unicast/multicast/broadcast) are forwarded both on physical 142 and tunnel 124 ports 170 in the VLAN 141 as in normal L2 forwarding. Therefore, each of the mobility switches 120 restricts frame forwarding to physical ports 170-12, 170-22 only if there is direct connectivity to the VLAN, and employs the tunnel ports 170-21, 170-11 for forwarding the frame if there is no physical connectivity in the VLAN 141. By the above rule, relating to the example in FIG. 2, mobility switches 120-1 and 120-2 use the wired direct connectivity 142 instead of tunnel ports to forward the traffic of Mobile users in the VLAN 141.

Figure 3:
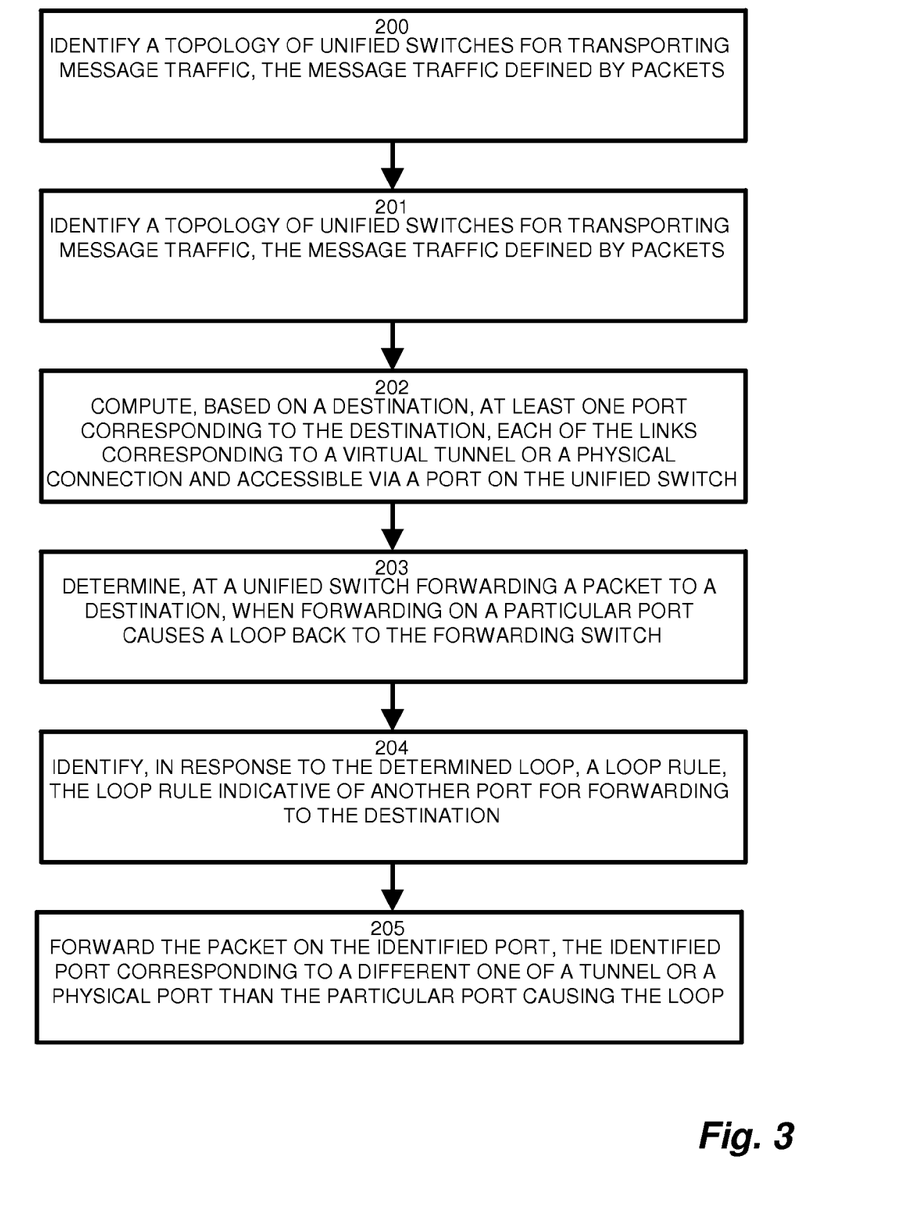
FIG. 3 is a flowchart of the unified switch of FIG. 2 performing loop prevention.

FIG. 3 is a flowchart of the unified switch of FIG. 2 performing loop prevention. Referring to FIGS. 2 and 3, the method of loop prevention in a unified split-plane mobility domain 100 as disclosed herein includes, at step 200, identifying a topology of unified switches 120 (mobility switches) for transporting message traffic, in which the message traffic is defined by packets 101. The domain 100 identifies a set of links 142, 124, 126 between the unified switches 120 for forwarding message traffic packets 101, such that the links are defined by ports 170 on the unified switches 120, as depicted at step 201. The links 142, 124, 126 include hops between the unified switches 120, each invoked by forwarding on a port 170 corresponding to the link, which may be a physical connection 142, are a virtual link defined by a port 170 to a mobility tunnel 124 or an access tunnel 126. The forwarding unified switch 120 computes, based on a destination (i.e. mobile device 110 or a wired device 111), the ports 170 corresponding to the destination, such that each of the links corresponds to a virtual tunnel 124, 126 or a physical connection 142 and which is accessible via a port 170 on the unified switch 170, as disclosed at step 202.

The unified switch 120 forwarding the packet 101 determines when forwarding on a particular port 170 may cause a loop 128 back to the forwarding switch 120, as depicted at step 203. The unified switch 120 identifies, in response to the determined loop 128, a loop rule 119, such that the loop rule is indicative of another port 170 for forwarding to the destination 110, as shown at step 204. The loop rules 119 define a configuration similar to a conventional routing table, and may be initially set as an administrative task, may be received from the mobility controller 150 (as propagated "routes"), or propagated via other unified switches 150. In the example of FIG. 2, the existence of both a physical path 142-4 and a tunnel 124 leading eventually to a destination 111, for example, via port 170-35 triggers the rule specifying use of the port 170-22 corresponding to the physical link 142-2. The unified switch 120 thus forwards the packet on the identified port 170 as determined by the rule 119, such that the identified port 170 corresponds to a different one 170-22 of a tunnel 170-21 or a physical port 170-22 than the particular port 170 causing the loop, as depicted at step 205.

Figure 4:
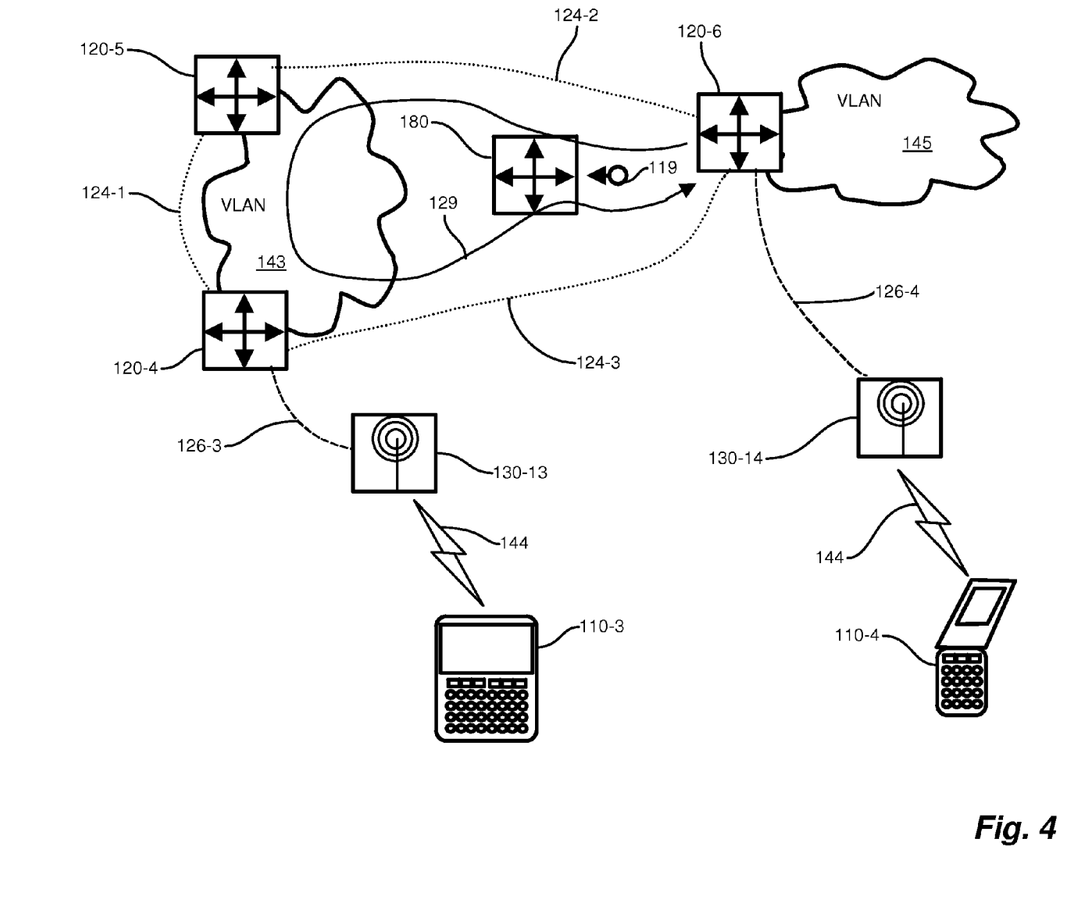
FIG. 4 is a unified switch configuration including a roaming user in the mobility domain of FIG. 1.

FIG. 4 is a unified switch configuration including a roaming user in the mobility domain 100 of FIG. 1. Referring to FIG. 4, mobility switches 120-4, 120-5 and 120-6 establish mobility tunnels 124-1, 124-2 and 124-3 between them. Mobile devices 110-3 and 110-4 are served by access points 130-13 and 130-14 respectively, as part of VLAN 143. As above, multiple mobility switches 120-4 and 120-5 are provided for redundancy. When mMobility device 110-4 roams into a coverage area supported by access point 130-14, thus causing mobility switch 120-6 to seek a mobility tunnel back to "home" VLAN 143. Because of the redundant configuration, multiple paths exist via mobility tunnels 124-2 and 124-3, resulting in potential loop 129, if mobility switch 120-6 is permitted to utilize both switches 120-4 and 120-5. A rule specifying that mobility switch 120-6 select one mobility switch 120-4 or 120-5 (or any server of VLAN 143) for accessing a particular destination on VLAN 143. In the reverse case, in which both mobility switches 120-4 and 120-5 have their mobility tunnels (124-2,124-3) connected to remote VLAN 145 on Mobility Switch 120-6, VLAN membership is monitored so that the mobility tunnel (124-1) or the physical link between 120-5 and 120-4 is not added to the remote VLAN 145.

Traffic from the roaming user 110-4 is therefore tunneled to the VLAN 143 through the selected virtual port 170 corresponding to mobility tunnel 124-2 or 124-3. The rule also encompasses transition periods where 120-4 or 120-5 fails and 120-6 has to move from one to other to maintain access to VLAN 143. The mobility switches 120 thus follow a "break" before "make" principle to prevent loops 129.

Figure 5:
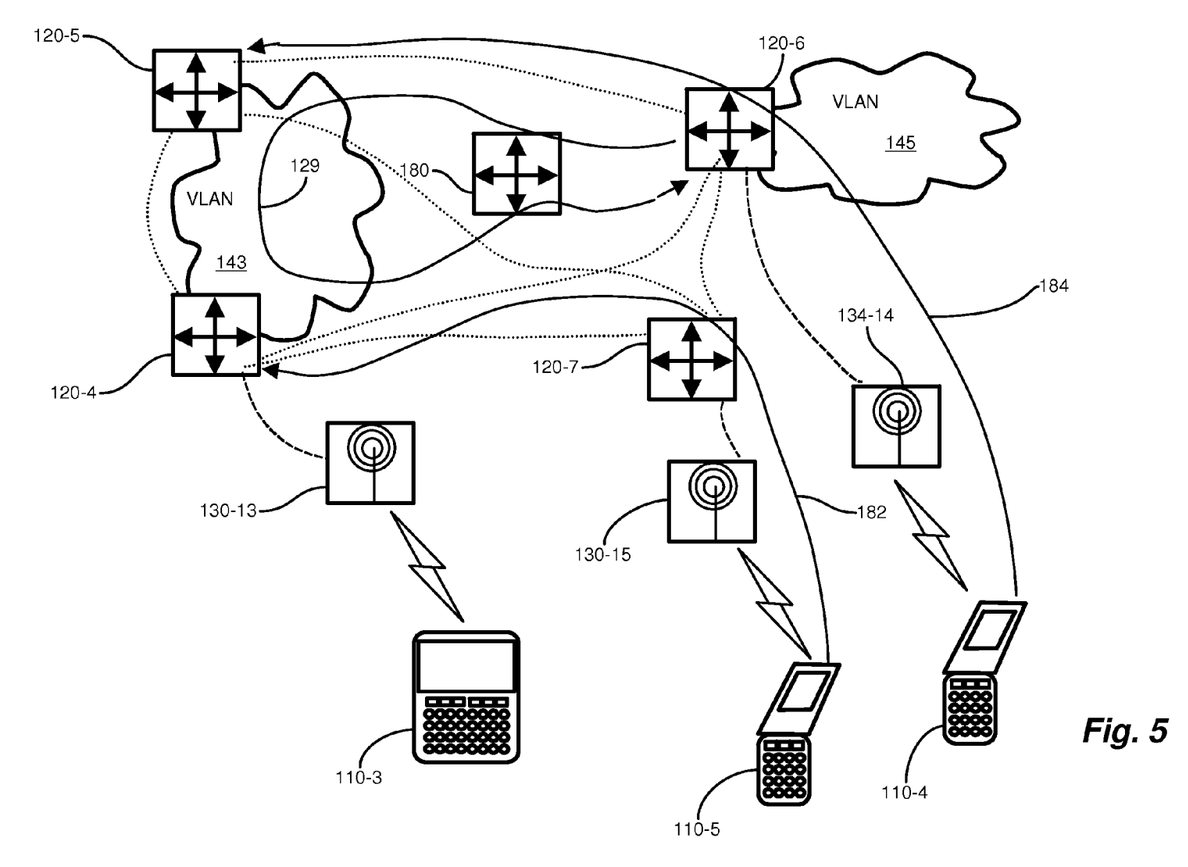
FIG. 5 is a unified switch configuration depicting multi-user load balancing in the configuration of FIG. 4.
Figure 6:
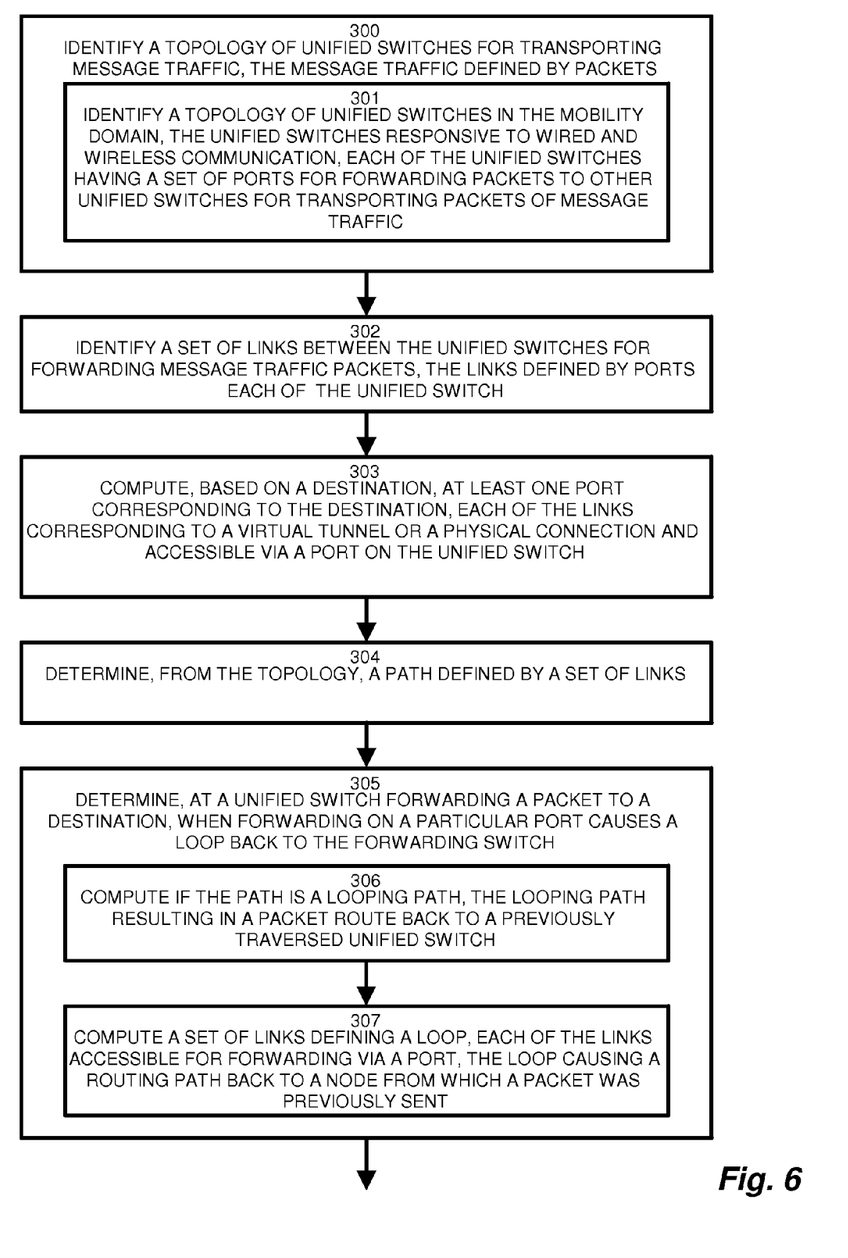
FIGS. 6-9 are a flowchart of rule selection for loop prevention in the configurations of FIGS. 2, 4 and 5
Figure 7:
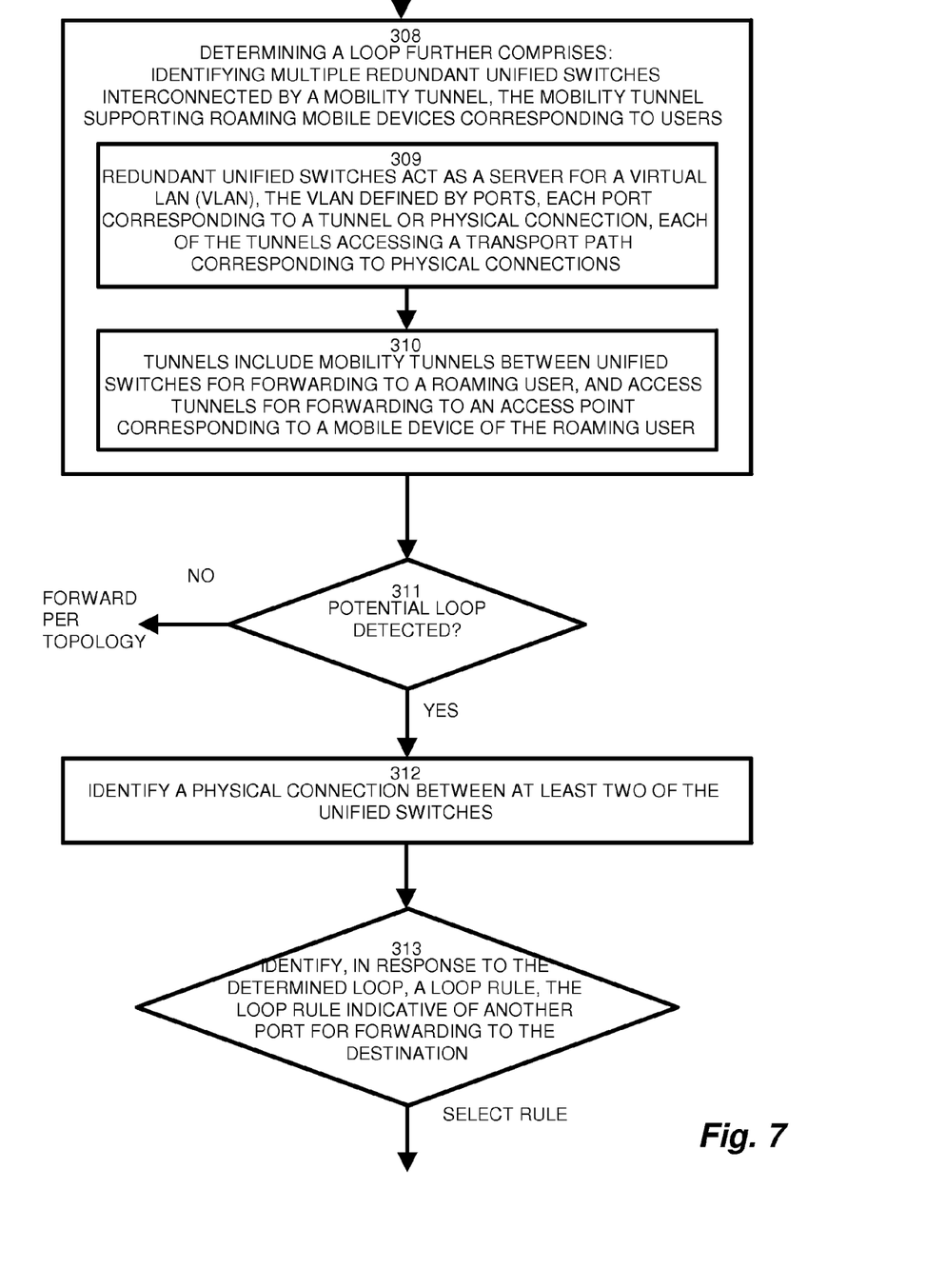
Figure 8:
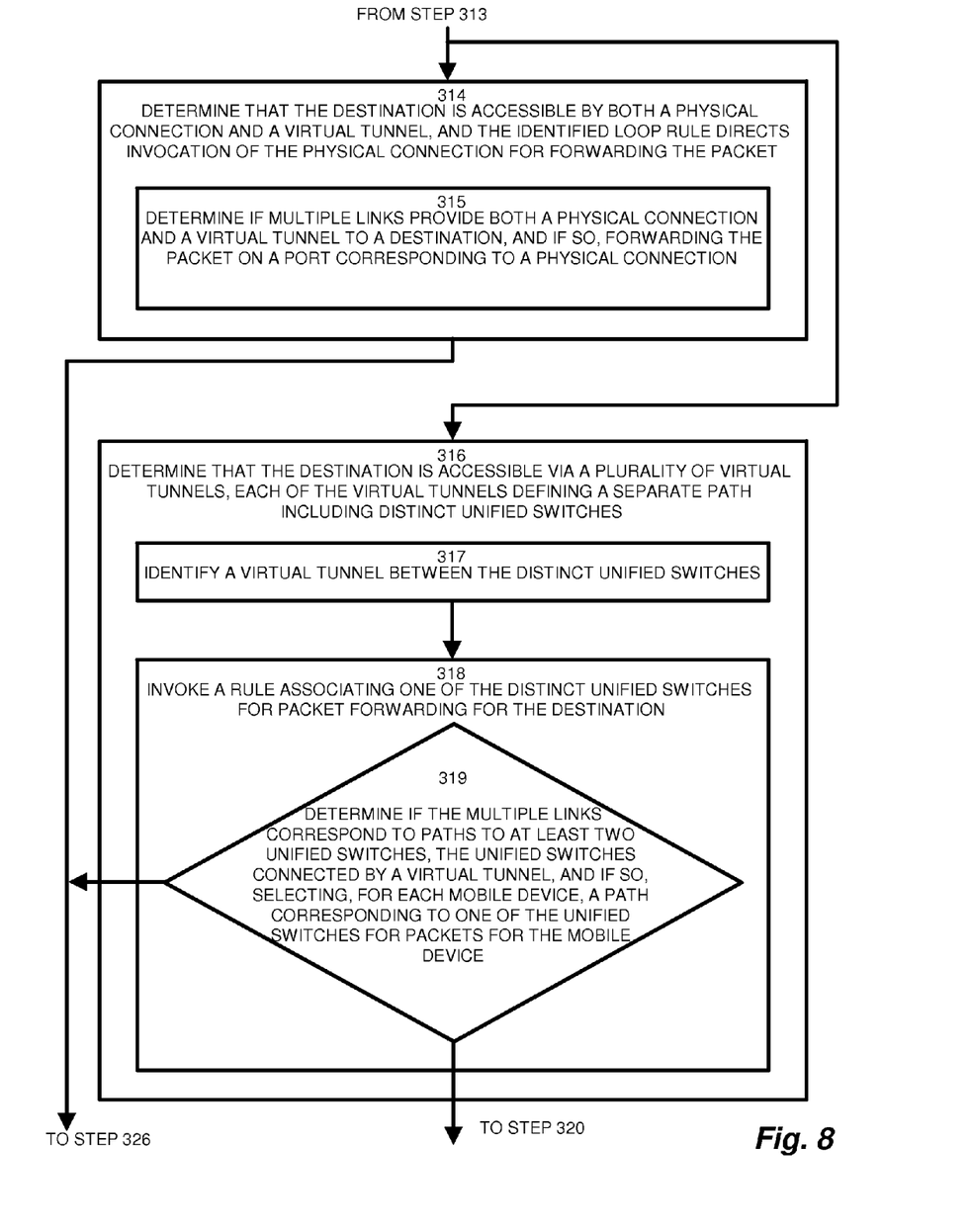
Figure 9:
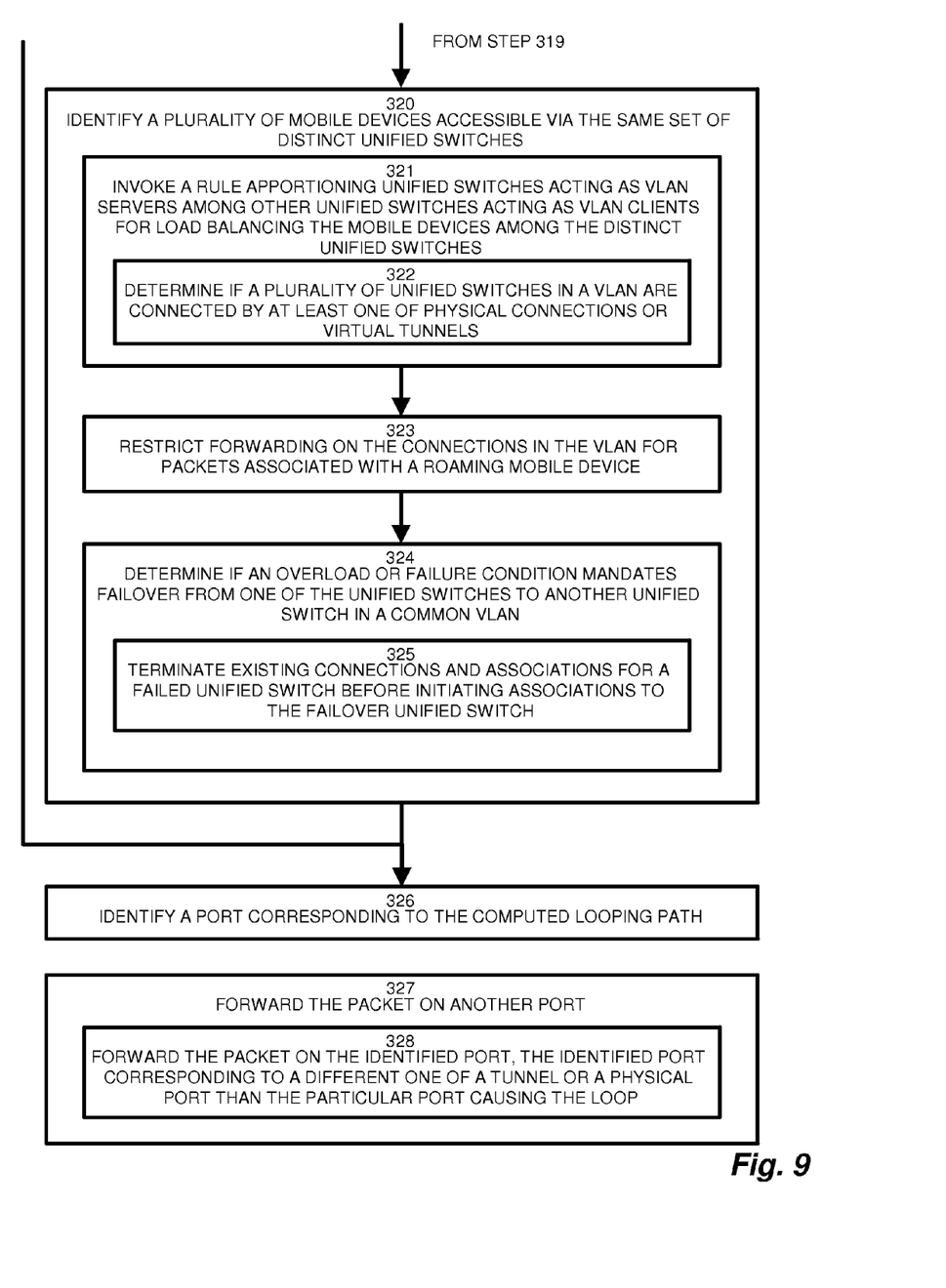

FIG. 5 is a unified switch configuration depicting multi-user load balancing in the configuration of FIG. 4. Mobile device 110-4 has a path 184 to VLAN 143 via mobility switch 120-5. An additional mobility switch 120-7 supporting mobile device 110-5 desires access to VLAN 143. Mobility Switch 120-7 picks mobility switch 120-4 to provide path 182 and is assigned as the designated mobility switch for serving VLAN 143 for all mobile devices connecting to switch 120-7. Mobility switch 120-6 continues to employ mobility switch 120-5 via path 184 for load balancing purposes. Additional client mobility switches may thus choose particular mobility switches 120 for load balancing and loop prevention. In the case of load balancing, allocation is based on switches 120 denoted as 'VLAN client' switches, rather than on mobile client devices. So all mobile clients on a particular VLAN coming to one remote switch will go to one of the multiple switches 120 acting as a server for that VLAN.

The configuration of FIG. 5 is an extension of the configuration of FIG. 4. The additional unified switch 120-7 raises the issue of allocating multiple client switches and thus users among available VLAN Server unified switches 120. In the example shown, mobile device 110-4 using access points 130-14 is assigned unified server switch 120-5 by client switch 120-6, and mobile device 110-5 using access point 130-15 is assigned unified server switch 120-4 by client switch 120-7. The unified switches 120 and access points 130 follow the same rules and thus prevent loops in this case also without hindering load balancing of roamed traffic.

An example rule set may be stated as follows. Other rules may be envisioned without departing from the loop prevention operation of the unified mobility switches operating in the mobility domain 100. Mobility switches (unified switches 120) which provide physical connectivity for a VLAN 141, 143, 145 shall use the ports 170 associated with physical connections 142 for forwarding the traffic in that VLAN. Such ports 170 are treated as VLAN servers for that VLAN. The unified switch 120 shall use the ports 170 associated with mobility tunnels 124 to forward the packets 101 only when there is no physical connectivity for that VLAN. Such mobility switches 120 are therefore referred to as client switches for that VLAN. Client switches forward the traffic to VLAN servers through the tunnel ports 170. On a client switch, if multiple tunnel ports provide connectivity to a VLAN, the client mobility switch shall pick only one of them (based on the load balancing or other selection rule) to forward the traffic in that VLAN. Forwarding the packets 101 on all the tunnel ports 170 may result in a packet loop 129. When two or more client switches 120-6, 120-7 are using the services of a VLAN 143, they shall not use the tunnel 124, 126 ports or physical 142 ports between them for forwarding the traffic in that Remote VLAN 145. Doing so will result in the packet loop. To facilitate this outcome, client mobility switches 120 shall follow 'break' before 'make" rule while switching over/failing over from one VLAN server to the other.

FIGS. 6-9 are a flowchart of rule selection for loop prevention in the configurations of FIGS. 2, 4 and 5. Referring to FIGS. 2 and 4-9, the method of loop prevention in a unified split-plane mobility domain includes, at step 300, identifying a topology of unified switches 120 for transporting message traffic, in which the message traffic is defined by frames as in a typical Ethernet network. This includes identifying a topology of unified switches 120 in the mobility domain 100, in which the unified switches 120 are responsive to wired and wireless communication, and each of the unified switches 120 has a set of ports 170 for forwarding packets 101 to other unified switches 120 for transporting the packets of message traffic, as depicted at step 301.

The network 141 identifies a set of links 142 between the unified switches 120 for forwarding the message traffic packets 101, in which the links 142 are defined by ports 170 on each of the unified switch, as shown at step 302. Upon receipt of a packet 101 for forwarding, the unified switch 120 computes, based on a destination 110, at least one port 170 corresponding to the destination, such that each of the links corresponds to a virtual tunnel 124, 126 or a physical connection 142 and such that it is accessible via a port 170 on the unified switch 120, as shown at step 303. Each unified switch 120 maintains a topology of links 142 to adjacent unified switches 120, however need not establish a link 142 with every adjacent unified switch 120. In particular arrangements, the unified switches 120 may establish links according to a mobility switch table that defines switch 120 visibility of other switches 120 in the mobility domain 100, thus allowing a mesh or hierarchy rather than simply an adjacency topology. In routing the packet 101 to the destination 110, the unified switch 120 determines, from the topology, a path defined by a set of links 142, which may include one or more links as a tunnel 124, 126, as depicted at step 304. The unified switch 120 forwarding the packet 101 to a destination 110 determines when forwarding on a particular port 170 causes a loop back to the forwarding switch 120, as disclosed at step 305. The unified switch computes if the path is a looping path 129, such the looping path results in a packet route back to a previously traversed unified switch 120, disclosed at step 306.

In the unified switch 120, that handles both wired and wireless destination, multiple ports 170 may offer a path to the same destination 110 via different paths, including a combination of physical links 142 and tunnels 124, 126. Therefore, determining a loop 128 includes computing a set of links 142, 124 and 126 that define a loop 128, such that each of the links is accessible for forwarding via a port 170 in which the loop 128 causes a routing path back to a node (unified switch 120 or other network entity) from which the packet 101 was previously sent, as depicted at step 307.

Upon concluding that a potential loop exists, at step 308, the unified switch 120 determines a set of redundant links 142, 124 or 126 resulting in the potential loop 129. The unified switch 120 identifies multiple redundant unified switches 120 interconnected by a mobility tunnel 124 supporting roaming mobile devices 110 corresponding to users, as shown at step 309. Generally, the redundant unified switches (120-1,2 in FIG. 3) define a virtual LAN (VLAN), in which the VLAN has members including at least one tunnel 124, 126 and each of the tunnels includes a plurality of links corresponding to physical connections 142, as depicted at step 310. The tunnels include mobility tunnels 124 between unified switches 120 for forwarding to a roaming user, and access tunnels 126 for forwarding to an access point 130 corresponding to a mobile device 110 of the roaming user, as disclosed at step 311. The tunnels 124 and 126 include virtual mappings of one or more physical connections 124, and are mapped to the ports 170. Thus, a forwarding decision results in forwarding on a particular port 170, whether by physical 142 or virtual 124, 126 connection. At step 312, the unified switch 120 identifies a physical connection 142 between at least two of the unified switches 120, indicating the physical path that could result in a loop 129 via a combination of physical 142 and virtual 124, 126 forwarding decisions.

Having identified the physical 142 and virtual 124, 126 links upon which forwarding results in a loop path 129, the unified switch 120 identifies, in response to the determined loop 129, a loop rule 119 indicative of another port 170 for forwarding to the destination 110, as depicted at step 313. The selected loop rule 119 is dependent on the topology and available ports 170 and links 142, 124, 126 for forwarding. If it is determined that the destination 110 is accessible by both a physical connection and a virtual tunnel, as in FIG. 2, 120-1, 2, then the identified loop rule 119 directs invocation of the physical connection 142 for forwarding the packet 101, as shown at step 314. In a particular configuration, the loop rule 119 is selectable from a set of loop rules, and invoking the selected rule includes determining if multiple links provide both a physical connection and a virtual tunnel to a destination, and if so, forwarding the packet 101 on a port 170 corresponding to a physical connection 142, as disclosed at step 315. If the check at step 313 determines that the destination is accessible via a plurality of virtual tunnels, each of the virtual tunnels defining a separate path including distinct unified switches, as depicted at step 316, then the unified switch 120 identifies a virtual tunnel 124 between the distinct unified switches 120, as in switches 120-4, 5 in FIGS. 4 and 5 (step 317). The unified switch 120 invokes a rule 119 associating one of the distinct unified switches 120-4,5 for packet forwarding for the destination 110, as disclosed at step 318 and shown in FIG. 5. A check is performed, at step 319, for determining if the multiple links 124, 126, 142 correspond to paths to at least two unified switches 120-5, 6 such that the unified switches 120 are connected by a virtual tunnel 124, and if so, selecting, for each mobile device 110-4, 110-5, a path 182, 184 corresponding to one of the unified switches 120-4, 5 (respectively) for packets 101 for the mobile device 110-4, 5, as depicted at step 319.

Based on the check at step 319, control selectively passes to step 320, for identifying a plurality of mobile devices 110 accessible via the same set of distinct unified switches 120, as in the scenario depicted in FIG. 5 illustrating a further extension of the scenario of FIG. 4. The unified switch 120 invokes a rule 119 apportioning unified switches 120 acting as VLAN servers among other unified switches 120 acting as VLAN clients for load balancing the mobile devices 110 among the distinct unified switches 120-N, as shown at step 321. Therefore, when multiple VLAN server unified switches 120 are candidates for a plurality of paths through mobility tunnels 124, the VLAN client unified switches 120 select one of the server unified switches 120 so that the mobile devices 110 are apportioned among the available paths. This includes, at step 322, determining if a plurality of unified switches 120 in a VLAN are connected by at least one of physical connections or virtual tunnels. The unified switch 120 restricts forwarding on the connections in the VLAN for packets associated with a roaming mobile device 110-4, 5 as depicted at step 323 to avoid forwarding on the loop path 129.

In the event of failover or other imbalance, the loop rules further include determining if an overload or failure condition mandates failover from one of the unified switches 120 to another unified switch 120 in a common VLAN, as depicted at step 324, and terminating existing connections and associations for a failed unified switch 120 before initiating associations to the failover unified switch 120, as shown at step 325.

Based on the application of one or more of the rules 319 in step 314, 316 and 320, the unified switch 120 implements a routing (forwarding) decision by identifying a port 170 corresponding to the computed looping path 129, as depicted at step 326, and forwarding the packet on another port 170 that avoids the loop path 129, as disclosed at step 327. In operation, forwarding logic makes the right decision because the control layer manages VLAN membership of the physical or logical port. So the forwarding decision is the result of normal L2 switching when VLAN membership is implemented according to the loop prevention rules. Control message handling detects potential loops and enforces the rules by managing VLAN memberships of the tunnel and physical ports. The rules therefore direct port VLAN membership management, and need not interfere with routing decisions, which could adversely affect throughput and performance, because the forwarding decisions that avoid loop follow from setting VLAN membership accordingly. One particular feature of managing the VLAN memberships is that the forwarding logic remains standard and efficient and can be implemented by existing ASIC forwarding logic blocks. Conventional approaches, such as by modifying the forwarding logic may not be as efficient and may introduce non-standard behavior. The unified switch 120 thus forwards the packet 101 on the identified port 170, such that the identified port 170 corresponds to a different one of a tunnel 124, 126 or a physical port 170 and path 142 than the particular port 170 determined to cause the loop 129. Alternate implementations may incorporate other and/or additional rules for identifying and forwarding around looping paths, thus identifying alternate configurations for selecting from multiple ports associated with multiple virtual and/or physical paths triggered for the same routing destination.

It should be clarified that the forwarding logic employing the VLAN membership for avoiding loops (i.e. circuitous routes among a combination of physical connections and VLAN based forwarding) is directed to L2 forwarding and switching, in contrast to L3 routing, as is known in the art. Alternate configurations may apply similar operation on the scale of an L3 routing loop without deviating from the scope of the claimed approach.

Those skilled in the art should readily appreciate that the programs and methods for loop prevention in a unified split-plane mobility domain as defined herein are deliverable to a user processing and rendering device in many forms, including but not limited to a) a non-transitory computer readable storage medium, b) information permanently stored on non-writeable storage media such as ROM devices, c) information alterably stored on writeable storage media such as floppy disks, magnetic tapes, CDs, RAM devices, and other magnetic and optical media, or d) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for loop prevention in a unified split-plane mobility domain has been particularly shown and described with references to embodiments thereof, it will be understood by those skilled in the art that various changes in form and details may be made therein without departing from the scope of the invention encompassed by the appended claims.

What is claimed is:

1. A method of loop prevention in a unified split-plane mobility domain comprising:
    identifying a topology of unified switches for transporting message traffic, the message traffic defined by packets;
    identifying a set of links between the unified switches for forwarding message traffic packets, the links defined by ports on the unified switches;
    computing, based on a destination, at least one port corresponding to the destination, each of the links corresponding to a virtual tunnel or a physical connection and accessible via a port on the unified switch;
    determining, at a unified switch forwarding a packet to a destination, when forwarding on a particular port causes a loop back to the forwarding switch;
    identifying, in response to the determined loop, a loop rule, the loop rule indicative of another port for forwarding to the destination; and
    forwarding the packet on the port indicated by the loop rule, the indicated port corresponding to a different one of a tunnel or a physical port than the particular port causing the loop.

2. The method of claim 1 wherein determining includes computing a set of links defining a loop, each of the links accessible for forwarding via a port, the loop causing a routing path back to a node from which a packet was previously sent.

3. The method of claim 1 further comprising:
    identifying a topology of unified switches in the mobility domain, the unified switches responsive to wired and wireless communication, each of the unified switches having a set of ports for forwarding packets to other unified switches for transporting packets of message traffic;

determining, from the topology, a path defined by a set of links;

computing if the path is a looping path, the looping path resulting in a packet route back to a previously traversed unified switch;

identifying a port corresponding to the computed looping path; and forwarding the packet on another port.

4. The method of claim 1 wherein determining a loop further comprises:

identifying multiple redundant unified switches interconnected by a mobility tunnel, the mobility tunnel supporting roaming mobile devices corresponding to users; and identifying a physical connection between at least two of the unified switches.

5. The method of claim 4 wherein the redundant unified switches act as a server for a virtual LAN (VLAN), the VLAN defined by ports, each of the ports corresponding to a tunnel or a physical connection, each of the tunnels accessing a transport path corresponding to physical connections.

6. The method of claim 5 wherein the tunnels include mobility tunnels between unified switches for forwarding to a roaming user, and access tunnels for forwarding to an access point corresponding to a mobile device of the roaming user.

7. The method of claim 2 wherein determining the loop further comprises determining that the destination is accessible by both a physical connection and a virtual tunnel, and the identified loop rule directs invocation of the physical connection for forwarding the packet.

8. The method of claim 2 wherein determining the loop further comprises determining that the destination is accessible via a plurality of virtual tunnels, each of the virtual tunnels defining a separate path including distinct unified switches;

identifying a virtual tunnel between the distinct unified switches; and invoking a rule associating one of the distinct unified switches for packet forwarding for the destination.

9. The method of claim 8 further comprising:

identifying a plurality of mobile devices accessible via the same set of distinct unified switches; and invoking a rule apportioning server unified switches among client unified switches for load balancing the mobile devices among the distinct unified switches.

10. The method of claim 1 wherein the loop rule is selectable from a set of loop rules, the identified loop rule further including:

determining if multiple links provide both a physical connection and a virtual tunnel to a destination, and if so, forwarding the packet on a port corresponding to a physical connection.

11. The method of claim 10 wherein the loop rules further include:

determining if the multiple links correspond to paths to at least two unified switches, the unified switches connected by a virtual tunnel, and if so, selecting, for each mobile device, a path corresponding to one of the unified switches for packets for the mobile device.

12. The method of claim 11 wherein the loop rules further include:

determining if a plurality of unified switches in a VLAN are connected by at least one of physical connections or virtual tunnels; and restricting forwarding on the connections in the VLAN for packets associated with a roaming mobile device.

13. The method of claim 12 wherein the loop rules further include:

determining if an overload or failure condition mandates failover from one of the unified switches to another unified switch in a common VLAN; and terminating existing connections and associations for a failover user before initiating associations to the failover unified switch.

14. A mobility switch for loop prevention in a unified split-plane mobility domain comprising:

an interface configured to identify a topology of unified switches for transporting message traffic, the message traffic defined by packets;

a set of ports associated to links between the unified switches for forwarding message traffic packets, the links defined by ports on the unified switches;

forwarding logic for computing, based on a destination, at least one port corresponding to the destination, each of the links corresponding to a virtual tunnel or a physical connection and accessible via a port on the unified switch;

a set of rules configured for determining, at a unified switch forwarding a packet to a destination, when forwarding on a particular port causes a potential loop back to the forwarding switch; and the forwarding logic configured to identify, in response to the determined potential loop, a loop rule identifying VLAN membership resulting in multiple forwarding ports causing the potential loop, the loop rule indicative of another port for forwarding to the destination, forward the packet on the port indicated by the loop rule, the indicated port corresponding to a different one of a tunnel or a physical port than the particular port causing the loop.

15. The mobility switch of claim 14 wherein the rules are further configured to compute a set of links defining a loop, each of the links accessible for forwarding via a port, the loop causing a routing path back to a node from which a packet was previously sent.

16. The mobility switch of claim 14 wherein the rules are further configured to:

identify a topology of unified switches in the mobility domain, the unified switches responsive to wired and wireless communication, each of the unified switches having a set of ports for forwarding packets to other unified switches for transporting packets of message traffic;

determine, from the topology, a path defined by a set of links;

compute if the path is a looping path, the looping path resulting in a packet route back to a previously traversed unified switch;

identify a port corresponding to the computed looping path; and forward the packet on another port.

17. The mobility switch of claim 14 wherein the rules are further configured to:

identify multiple redundant unified switches interconnected by a mobility tunnel, the mobility tunnel supporting roaming mobile devices corresponding to users; and identify a physical connection between at least two of the unified switches, the redundant unified switches defining a virtual LAN (VLAN), the VLAN defined by at least one tunnel, each of the tunnels including a plurality of links corresponding to physical connections.

18. The mobility switch of claim 14 wherein the loop rule is selectable from a set of loop rules, the identified loop rule further including:
   determining if multiple links provide both a physical connection and a virtual tunnel to a destination, and if so, forwarding the packet on a port corresponding to a physical connection.

19. The mobility switch of claim 18 wherein the loop rules are further configured to:
   identify a plurality of mobile devices accessible via VLAN membership associated with a plurality of distinct unified switches;
   determine if the multiple links correspond to paths to at least two unified switches, the unified switches connected by a virtual tunnel, and if so, selecting, for each VLAN associated with the identified mobile devices, a path corresponding to one of the unified switches for packets for the mobile device; and
   apportion unified switches among associated mobile devices for load balancing the mobile devices among the distinct unified switches.

20. A computer program product having computer program code encoded as a set of instructions on a non-transient computer readable storage medium that, when executed by a processor, cause the computer to perform a method for managing a split-plane wireless network, the method comprising:
   identifying a topology of unified switches for transporting message traffic, the message traffic defined by packets;
   identifying a set of links between the unified switches for forwarding message traffic packets, the links defined by ports on the unified switches;
   computing, based on a destination, at least one port corresponding to the destination, each of the links corresponding to a virtual tunnel or a physical connection and accessible via a port on the unified switch;
   determining, at a unified switch forwarding a packet to a destination, when forwarding on a particular port causes a loop back to the forwarding switch;
   identifying, in response to the determined loop, a loop rule, the loop rule indicative of another port for forwarding to the destination; and
   forwarding the packet on the port indicated by the loop rule, the indicated port corresponding to a different one of a tunnel or a physical port than the particular port causing the loop.

* * * * *